United States Patent Office 3,388,173
Patented June 11, 1968

3,388,173
PREPARATION OF NITROAROMATIC HYDROXIDES
Danford H. Olson and Phillip W. Storms, Littleton, Colo., assignors to Marathon Oil Company, Findlay, Ohio, a corporation of Ohio
No Drawing. Filed June 9, 1964, Ser. No. 373,864
7 Claims. (Cl. 260—622)

ABSTRACT OF THE DISCLOSURE

A method of producing nitrated arylhydroxides, particularly, mono- and polynitrophenols by direct nitration of the corresponding aromatic hydrocarbon hydroperoxides.

Various methods for the production of nitrophenols have long been known in the art. Perhaps the two most important commercial methods of producing these compounds are (1) nitration of chlorobenzene followed by hydrolysis, and (2) sulfonation of phenol followed by nitration. These methods, and other methods of lesser importance as well, suffer a number of significant disadvantages. These disadvantages, in the main, relate to the number and types of reactants necessary for carrying out the methods, the number of separate reactions involved, the nature of the end products, other than the desired nitrophenols, produced and, correlatively, the number of manipulative steps required to obtain the nitrophenols. Thus, for example, the method utilizing chlorobenzene involves the use of chlorine as a reactant which is recovered as difficult-to-handle hydrochloric acid and an inorganic chloride, i.e. sodium chloride. In addition, this method requires the use of a "mixed" nitrating agent comprising nitric acid and sulfuric acid. The second of the two aforementioned commercially employed methods of producing nitrophenols, that is, sulfonation of phenol followed by nitration, requires five major separate chemical reactions when using benzene as the starting material, or at least two such reactions when phenol is utilized as the starting material.

In accordance with the present invention, a novel, yet simple, method of producing nitro aromatic hydroxides, especially nitrophenols, has been evolved which includes the step of directly nitrating an aromatic hydrocarbon hydroperoxide. The reaction goes to completion in a single step and the nitrophenols thereafter are recovered by standard product separation techniques. In achieving the objectives of this invention, cumene hydroperoxide is especially important as the starting material. Cumene is available by synthesis from petroleum and can be formed into the hydroperoxide by direct oxidation with air or oxygen. The cumene hydroperoxide desirably is used in the form of a commercially available concentrated solution, for instance, containing about 65 to 85, usually about 75, weight percent of cumene hydroperoxide.

The nitrating agent utilized in the method of the present invention may be selected from any of a number of compounds capable in solution of furnishing the nitronium ion. Of especial utility are nitric acid and dinitrogen tetroxide. The nitric acid may vary considerably in strength. Good results can be attained with aqueous solutions of nitric acid of strength of from about 32 to 86%, with especially desirable results being obtained with aqueous solutions containing from about 50 to 75 weight percent of nitric acid. The concentration of the nitric acid employed is not, however, critical to the attainment of the objectives of the invention. The only condition to be satisfied in this regard is that at least one mole of the acid be present for each mole of cumene hydroperoxide in the reaction mixture. Dinitrogen tetroxide is available commercially in various grades, but advantageously is utilized in a purified form. Lower grades of this agent, however, can be readily conditioned for use in the method of this invention by passing them through a drying tower of phosphorus pentoxide to remove traces of water and nitric acid. The dried product then may be treated with dry oxygen to remove traces of lower oxides of nitrogen. Apart from nitric acid and dinitrogen tetroxide, various stable nitronium salts such as, for instance, nitronium tetrofluoroborate, also may be used as nitrating agents but, from a practical standpoint, are less desirable. The objectives of this invention are most advantageously attained by the utilization of a single nitrating agent, and while a mixture of nitrating agents can be used, such practice from a practical standpoint is not preferred.

The proportions of cumene hydroperoxide and nitrating agent utilized in the method of this invention can be varied within appreciable limits. In this connection, the quantity of nitrating agent used, particularly in the case of nitric acid, has been discovered to be determinative of the character of the nitrophenols obtained. Thus, it has been found that mononitrophenols are produced with approximately stoichiometric or theoretical proportions of cumene hydroperoxide and nitric acid, that is, a cumene hydroperoxide to nitric acid molar ratio of about 1:1, with especially desirable results being obtained when the nitric acid component is utilized in slight excess, or in a molar ratio of cumene hydroperoxide to nitric acid of the order of 1 of cumene hydroperoxide to about 1.05 to about 1.1 of nitric acid. Polynitrophenols, such as di- and tri-nitrophenol, can be produced in good yield in accordance with this practice by decreasing the molar ratio of cumene hydroperoxide to nitric acid of 1 of cumene hydroperoxide to about 3, or more, of nitric acid. In utilizing dinitrogen tetroxide as the nitrating agent, molar ratios of cumene hydroperoxide to the tetroxide desirably range from 1 of cumene hydroperoxide to about 3, usually about 1.5 to about 2.5, of dinitrogen tetroxide.

Due to the general exothermic character of the nitration reaction, the method of the present invention especially advantageously is carried out in the presence of an organic liquid which is essentially non-reactive under the conditions involved both with respect to the reactants and the product or products formed therefrom, or, if reactive with respect to any of the products, is of a character such that it can be readily cleaved or separated from them. In accordance with the preferred practice of the invention, preparation of the nitration reaction mixture is initiated by first introducing the cumene hydroperoxide into the organic liquid. Thereafter, the nitrating agent advantageously is added directly to the organic liquid solution of cumene hydroperoxide, or, in certain instances, is added in the form of an organic liquid solution of the nitrating agent. Generally speaking, when nitric acid is utilized as the nitrating agent, the nitration may be carried out by direct addition of the acid to the organic liquid solution of cumene hydroperoxide. On the other hand, when the nitration is to be carried out with dinitrogen tetroxide as the nitrating agent, it is preferred first to introduce the tetroxide into a suitable volume of an organic liquid and then add this solution to the cumene hydroperoxide solution. Exemplary of organic liquids having utility for the purposes of the present invention are carbon tetrachloride, nitromethane, diethyl ether, chloroform, benzene, chlorobenzene, nitrobenzene, cumene, and mixtures thereof. In those instances wherein suitable temperature control equipment is made available, the nitration reaction can be carried out in the absence of an organic liquid. Thus, under such circumstances, the hydroperoxide can be added directly to, for example, a dilute nitric acid solution to effect the desired result.

The temperature at which the nitration reaction takes place is, in large measure, determined by the character of the nitrating agent employed. Concentrated nitric acid, for example, is found to react more vigorously with cumene hydroperoxide than does dinitrogen tetroxide and thus calls for more efficient cooling than would be required with dinitrogen tetroxide. Generally speaking, the nitration of cumene hydroperoxide is carried out at a temperature in the range of from about −10° C. to about 85° C., especially desirably at about 5° C. to 35° C. The nitrating agent particularly advantageously is added gradually or in increments at a rate sufficient to maintain the desired temperature conditions.

In order that the full details of the present invention will be even better understood, the following examples are provided. These examples are illustrative of the practice of the method of the invention and it should be understood that variations may be made therein in a number of particulars without in any way departing from the fundamental principles and teachings provided herein. The examples, therefore, are not to be construed in any way as limitative of the scope of the invention.

EXAMPLE 1

To 15 grams of cumene hydroperoxide dissolved in 150 ml. of chloroform, 6 grams of 70% nitric acid are added. The initial temperature of the solution is 0° C. The reaction mixture is stirred for one hour and warmed gradually to 25° C. Extraction of the solution with a 10 percent sodium hydroxide solution followed by acidification yields 11.8 grams of a mixture of ortho (30%) and para (70%) nitrophenol corresponding to a yield of 85%.

EXAMPLE 2

To 4 grams of a 75 weight percent cumene hydroperoxide solution dissolved in 65 ml. of carbon tetrachloride, 4.6 grams of a solution of dinitrogen tetroxide (dried over phosphorus pentoxide) in 25 ml. of dry carbon tetrachloride are added dropwise. The temperature of the reaction mixture rises from 25° C. to 33° C. The mixture is stirred for 12 hours at the ambient temperature of the mixture. A stream of nitrogen gas is passed through the reaction mixture to remove lower oxides of nitrogen. The solution is washed with water and dilute caustic. Acidification of the base extract gives a solid which is recrystallized from aqueous ethyl alcohol and is identified as 2,4-dinitrophenol.

EXAMPLE 3

To a solution of 0.1 gram mole of cumene hydroperoxide in 150 ml. of carbon tetrachloride at 5° C., 0.163 gram mole of dinitrogen tetroxide in 50 ml. of carbon tetrachloride is added over a 3 hour period. The reaction mixture is stirred for one hour and the nitrogen oxides then are removed by passing a stream of dry nitrogen gas through the reaction mixture. The resulting yellow colored solution is extracted with a 10 percent sodium hydroxide solution which, on acidification, gives 5.6 grams of a mixture of nitrophenols.

EXAMPLE 4

The method described in Example 3 is carried out except that 0.239 gram mole of dinitrogen tetroxide are used to which 1 ml. of 69% nitric acid is added. The reaction mixture is worked up as before yielding 8.1 grams of a mixture of nitrophenols.

EXAMPLE 5

A solution of 0.1 gram mole of cumene hydroperoxide in 150 ml. of chloroform is cooled to −10° C. in a Morton flask equipped with an efficient condenser, an addition funnel, and a motor driven stirrer. To this solution 15 grams (0.167 gram mole) of 70% nitric acid is added dropwise. After half of the nitric acid is added the reaction mixture warms to the reflux temperature of chloroform. The solution is then cooled to about 5° C. and the remainder of the nitric acid is added. The mixture is stirred for an additional hour and is extracted with a 10 percent sodium hydroxide solution. Acidification of the caustic solution gives 9.1 grams of nitrophenols comprising 50.4% orthonitrophenol, 2.8% paranitrophenol, 40.9% 2,4-dinitrophenol, and 5.9% 2,4,6-trinitrophenol.

EXAMPLE 6

A solution of 0.1 gram mole of cumene hydroperoxide in 150 ml. of chlorobenzene is cooled to 0° C. as described in Example 5. To this solution 0.102 gram mole of 70% nitric acid is added dropwise. The reaction is worked up also as described in Example 5. The spent acid layer is separated and mixed with an excess of a 10 percent sodium hydroxide solution. The non-acidic materials are removed by steam distillation. Acidification of the caustic solution yields 10 grams of nitrophenols comprising 50% orthonitrophenol and 50% paranitrophenol.

EXAMPLE 7

To 15 grams of cumene hydroperoxide dissolved in 150 ml. of chloroform and cooled to 0° C., 15 grams of 70% nitric acid is added dropwise with stirring. After addition of the acid is completed, the reaction mixture is warmed to 25° C. and stirred for 1 hour. The reaction mixture then is extracted with a 10 percent caustic solution and the basic layer is acidified, yielding 12.9 grams, corresponding to a yield of 69% of 2,4-dinitrophenol.

EXAMPLE 8

To a solution of 0.1 gram mole of tetralin hydroperoxide in 150 ml. of carbon tetrachloride at 10° C., 0.11 gram mole of 70% nitric acid is added incrementally over a period of 2 hours. The reaction mixture is stirred for an additional 2 hours and is then extracted with a 10 percent sodium hydroxide solution. The basic solution is acidified yielding gamma(2-hydroxy-5-nitrophenyl) butyric acid as one of the reaction products.

EXAMPLE 9

The method of Example 8 is carried out except that 1-phenyl cyclohexane hydroperoxide is substituted for tetralin hydroperoxide. The reaction mixture is worked up as before giving a mixture of nitrophenol and cyclohexanone.

While the invention has been described in detail, it will be understood that various modifications may be made in the light of the teachings hereof without departing from the spirit and scope of the invention. More specifically in this connection, while the invention has been described with particular reference to nitration of specific aromatic hydroperoxides, it will be clear to those skilled in the art that the method of this invention has applicability with respect to the nitration of other aromatic hydroperoxides, exemplary thereof being the hydroperoxides of p-cymene, diisopropyl benzene, iso- and diisopropyl-naphthalene, and the like.

What is claimed is:

1. A method of preparing mono- and polynitrophenols comprising forming a reaction mixture of an aromatic hydrocarbon hydroperoxide, wherein the hydroperoxide group is positioned on a carbon atom which is attached to the aromatic nucleus, and nitrating agent selected from the group consisting of nitric acid and dinitrogen tetroxide, reacting the hydroperoxide with the nitrating agent while maintaining the reaction mixture at a temperature in the range of about −10° C. to about 85° C., and recovering the nitrophenol formed.

2. A method of preparing nitrophenols comprising forming a reaction mixture of cumene hydroperoxide and a nitrating agent selected from the group consisting of nitric acid and dinitrogen tetroxide, reacting the hydroperoxide with the nitrating agent while maintaining the reaction mixture at a temperature in the range of about —10° C. to about 85° C., and recovering the nitrophenols formed.

3. A method of preparing nitrophenols comprising forming a reaction mixture of cumene hydroperoxide with concentrated nitric acid, reacting the cumene hydroperoxide with the nitric acid while maintaining the reaction mixture at a temperature in the range of about 5° C. to about 35° C., and recovering the nitrophenols formed.

4. A method of preparing nitrophenols comprising forming a reaction mixture of cumene hydroperoxide and dinitrogen tetroxide, reacting the cumene hydroperoxide with the dinitrogen tetroxide while maintaining the reaction mixture at a temperature in the range of about —10° C. to about 85° C., and recovering the nitrophenol formed.

5. A method of preparing nitrophenols comprising forming a reaction mixture of cumene hydroperoxide with concentrated nitric acid, the cumene hydroperoxide and nitric acid being present in the reaction mixture in a molar ratio of 1 of the cumene hydroperoxide to about 1.05 to about 1.1 of the nitric acid, allowing the cumene hydroperoxide and the nitric acid to react at a temperature in the range of about —10° C. to about 85° C., and recovering the nitrophenol formed.

6. A method of preparing nitrophenols comprising forming a reaction mixture of cumene hydroperoxide with dinitrogen tetroxide, the cumene hydroperoxide and dinitrogen tetroxide being present in the reaction mixture in a molar ratio of 1 of the cumene hydroperoxide to about 3 of the dinitrogen tetroxide, allowing the cumene hydroperoxide and the dinitrogen tetroxide to react at a temperature in the range of from about 5° C. to about 35° C., and recovering the nitrophenol formed.

7. A method of preparing nitrophenols comprising forming a reaction mixture of cumene hydroperoxide with a nitrating agent selected from the group consisting of concentrated nitric acid and dinitrogen tetroxide in an organic liquid selected from the group consisting of carbon tetrachloride, nitromethane, diethyl ether, chloroform, benzene, chlorobenzene, nitrobenzene, cumene, and mixtures thereof, the cumene hydroperoxide and nitrating agent being present in the reaction mixture in a molar ratio of 1 of the cumene hydroperoxide to about 3 of the nitrating agent, allowing the cumene hydroperoxide and the nitrating agent to react at a temperature in the range of from —10° C. to about 85° C., and recovering the nitrophenol formed.

No references cited.

BERNARD HELFIN, *Acting Primary Examiner.*

LEON ZITVER, *Examiner.*

W. B. LONE, *Assistant Examiner.*